US009211455B2

(12) United States Patent
Savarese et al.

(10) Patent No.: US 9,211,455 B2
(45) Date of Patent: Dec. 15, 2015

(54) GOLF CLUB GRIP WITH RFID ASSEMBLY

(71) Applicant: Radar Corporation, San Ramon, CA (US)

(72) Inventors: Chris Savarese, Danville, CA (US); Susan McGill, Redwood City, CA (US)

(73) Assignee: Tag Golf, LLC, Ridgeland, MS (US)

( * ) Notice: Subject to any disclaimer, the term of this patent is extended or adjusted under 35 U.S.C. 154(b) by 175 days.

(21) Appl. No.: 14/137,833

(22) Filed: Dec. 20, 2013

(65) Prior Publication Data

US 2014/0235364 A1 Aug. 21, 2014

Related U.S. Application Data

(60) Provisional application No. 61/740,417, filed on Dec. 20, 2012.

(51) Int. Cl.
| | |
|---|---|
| *A63B 53/14* | (2015.01) |
| *A63B 69/36* | (2006.01) |
| *G06K 19/077* | (2006.01) |
| *G06K 19/04* | (2006.01) |
| *A63B 57/00* | (2015.01) |

(52) U.S. Cl.
CPC .............. *A63B 53/14* (2013.01); *G06K 19/041* (2013.01); *G06K 19/0772* (2013.01); *G06K 19/07758* (2013.01); *A63B 57/00* (2013.01); *A63B 2220/833* (2013.01); *A63B 2225/54* (2013.01); *Y10T 29/49826* (2015.01)

(58) Field of Classification Search
USPC .......... 473/221, 223, 224, 226, 231, 233, 409
See application file for complete search history.

(56) References Cited

U.S. PATENT DOCUMENTS

| | | |
|---|---|---|
| D627,021 S | 11/2010 | Savarese et al. |
| D633,966 S | 3/2011 | Savarese et al. |
| D649,609 S | 11/2011 | Savarese et al. |
| D649,610 S | 11/2011 | Savarese et al. |
| D664,619 S | 7/2012 | Savarese et al. |
| 8,226,496 B2 | 7/2012 | Galloway |
| D668,728 S | 10/2012 | Savarese et al. |
| D670,778 S | 11/2012 | Savarese et al. |
| 2013/0144411 A1 | 6/2013 | Savarese et al. |

*Primary Examiner* — Nini Legesse
(74) *Attorney, Agent, or Firm* — Blakely, Sokoloff, Taylor & Zafman LLP

(57) ABSTRACT

Methods and apparatuses related to golf club grips with attached or embedded RFID tags are described. In an embodiment, a RFID tag is attached to or embedded into a golf club grip in a manner that does not compromise either the functionality or aesthetics of the grip. In an embodiment, the embedded or attached RFID tag is located in the butt-end of the grip, perpendicular to the shaft of the golf club.

22 Claims, 11 Drawing Sheets

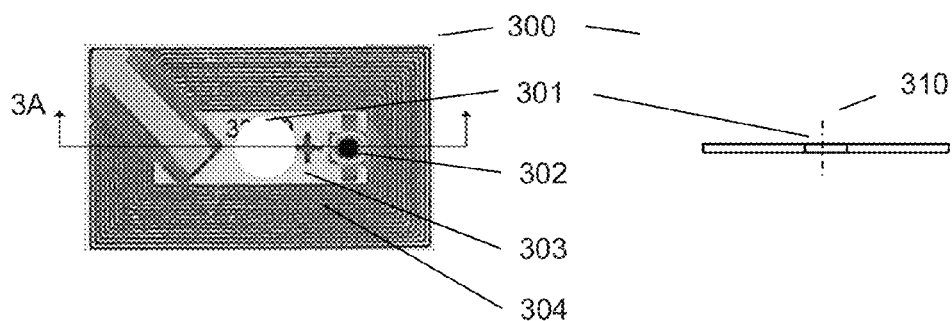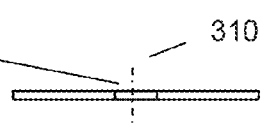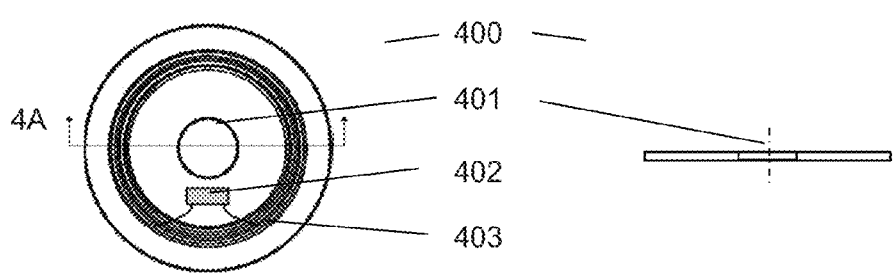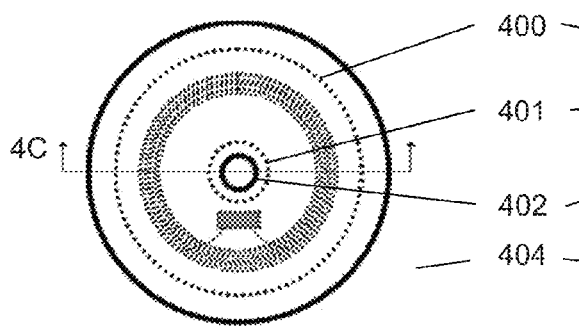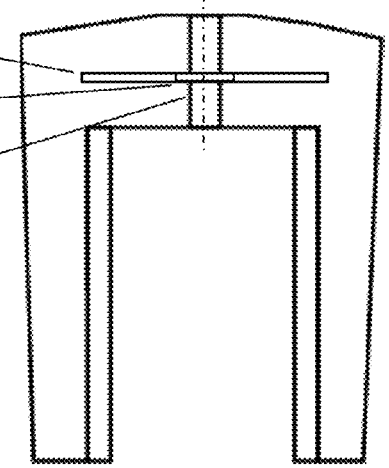

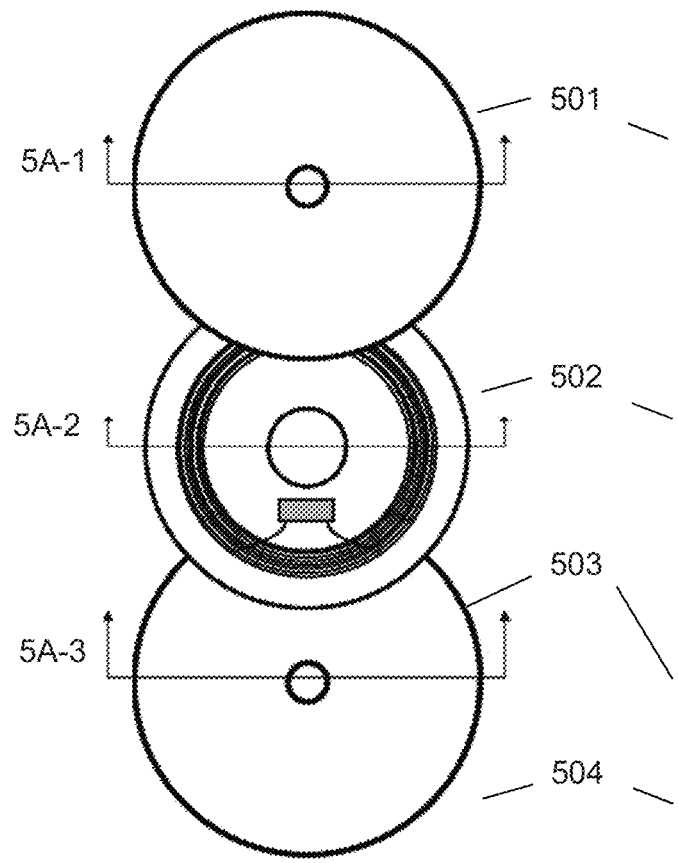
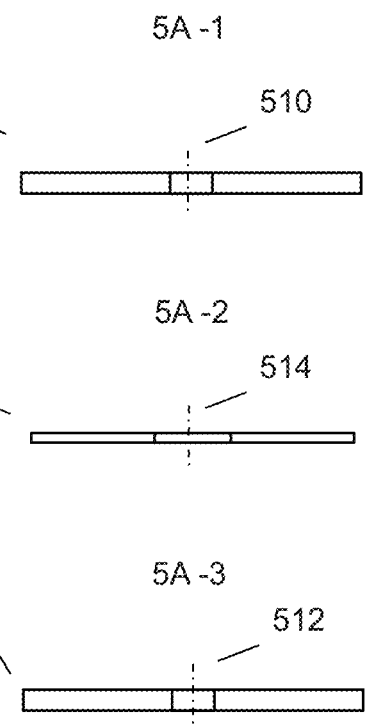
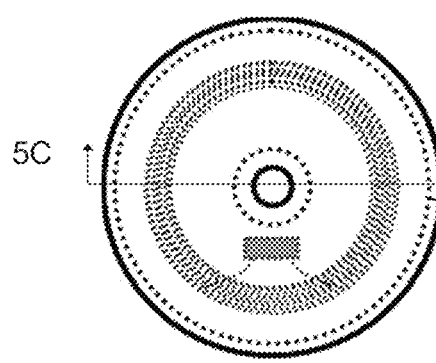
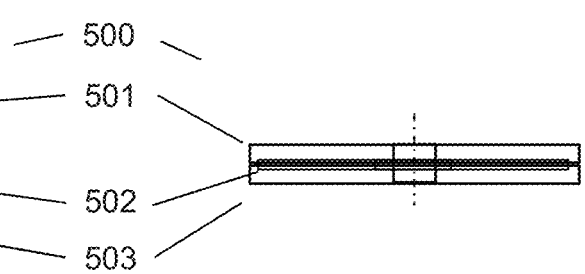

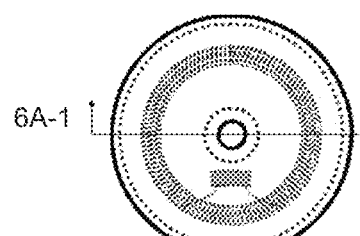
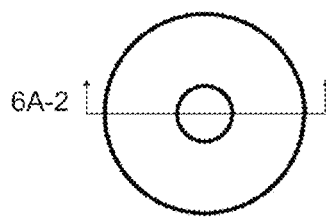
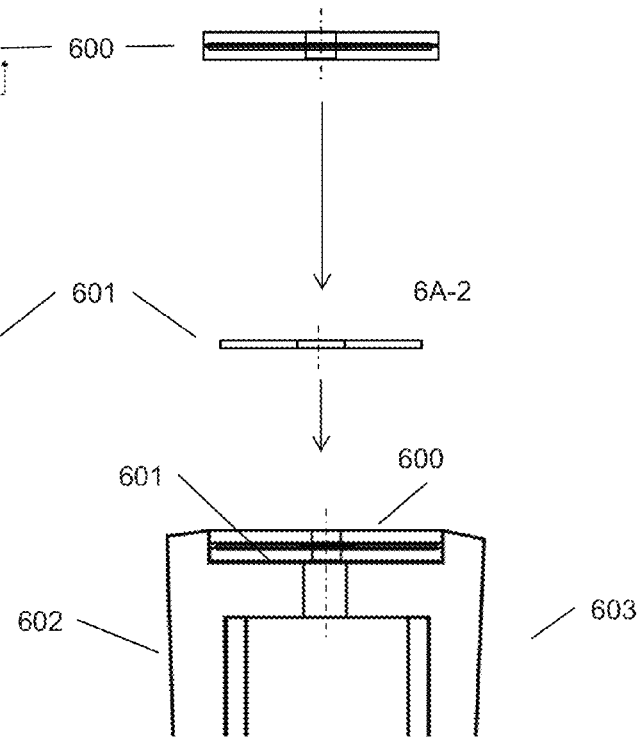
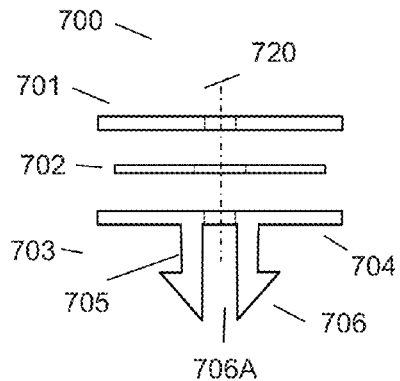
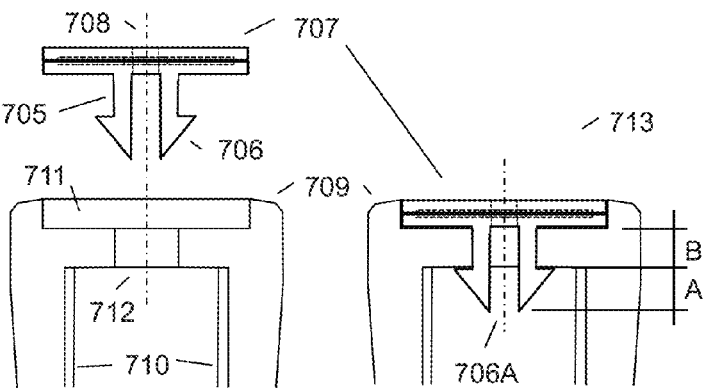

FIG 8 　　　　　　　　FIG 8A
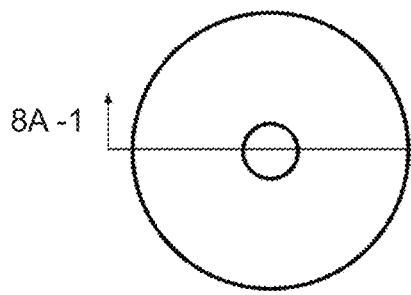 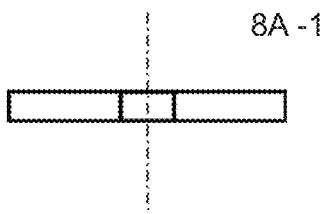
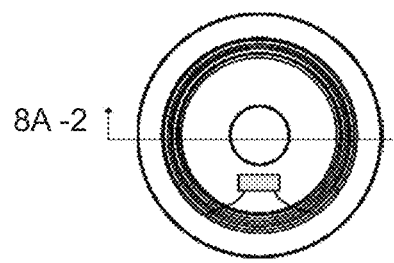
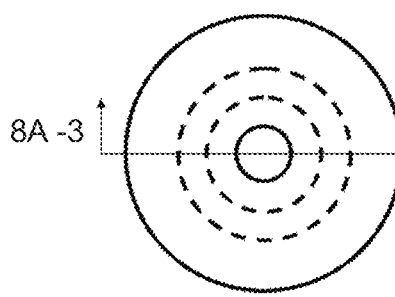
FIG 8B
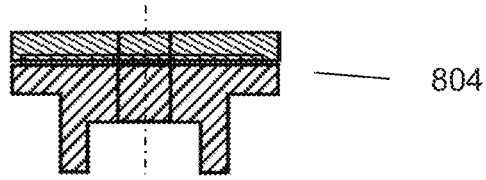
FIG 9 　　　　　　　　FIG 9A
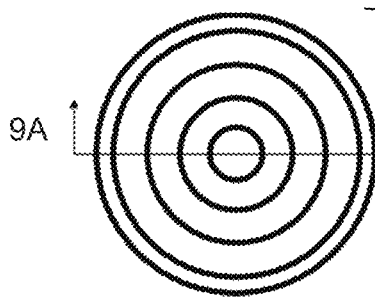 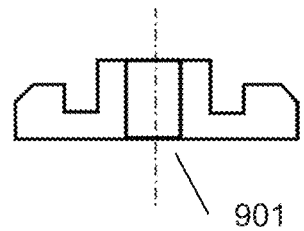

FIG 9B
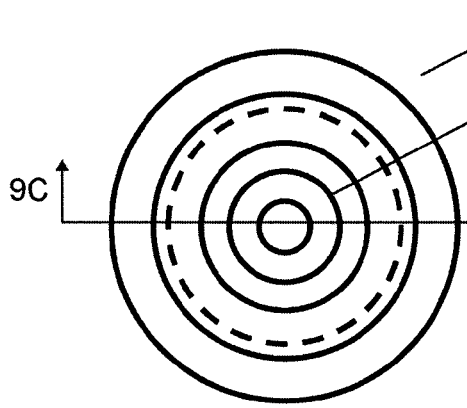
FIG 9C
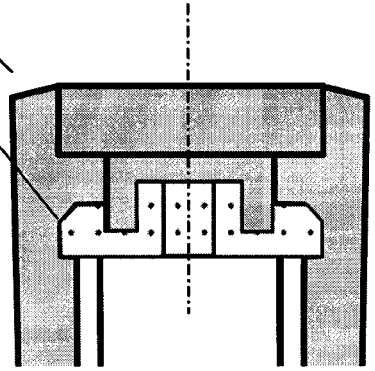
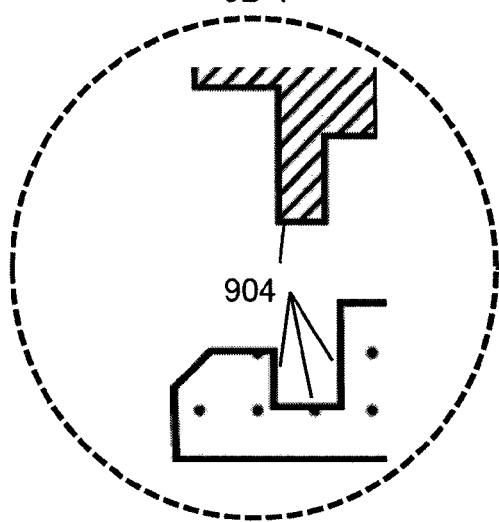
FIG 9D
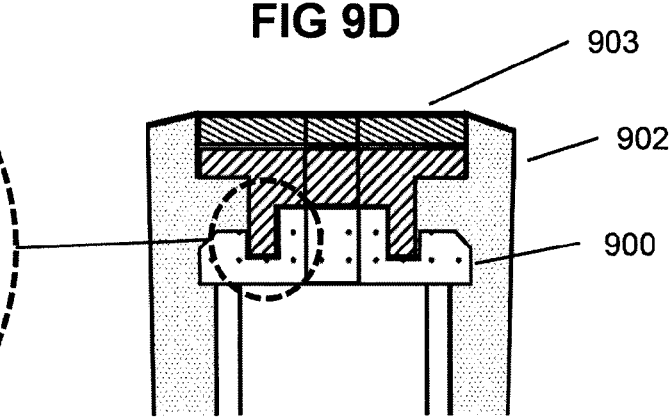
FIG 9E
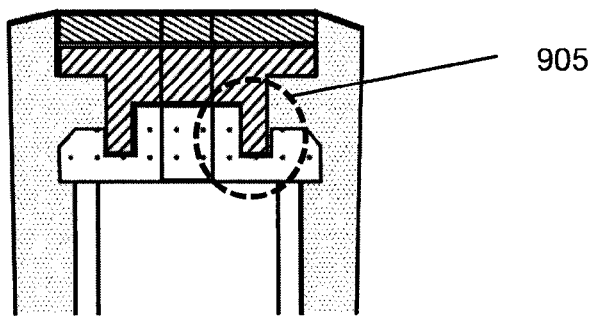

FIG 17A FIG 17B FIG 17C
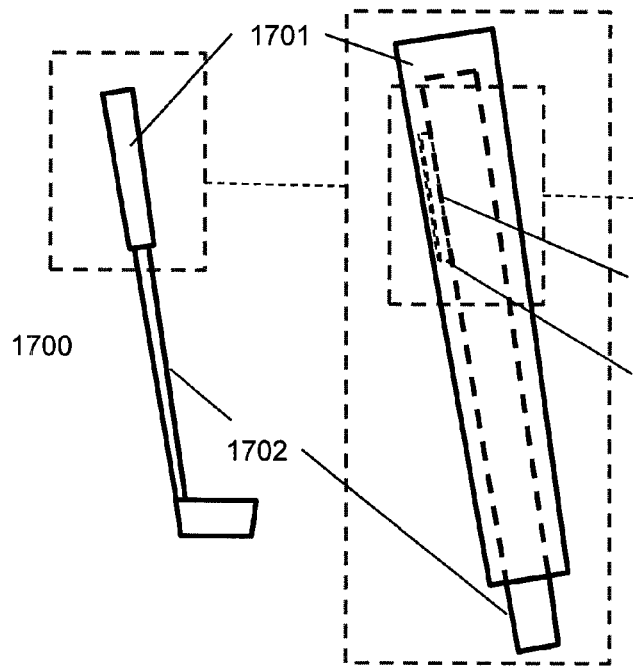
FIG 18
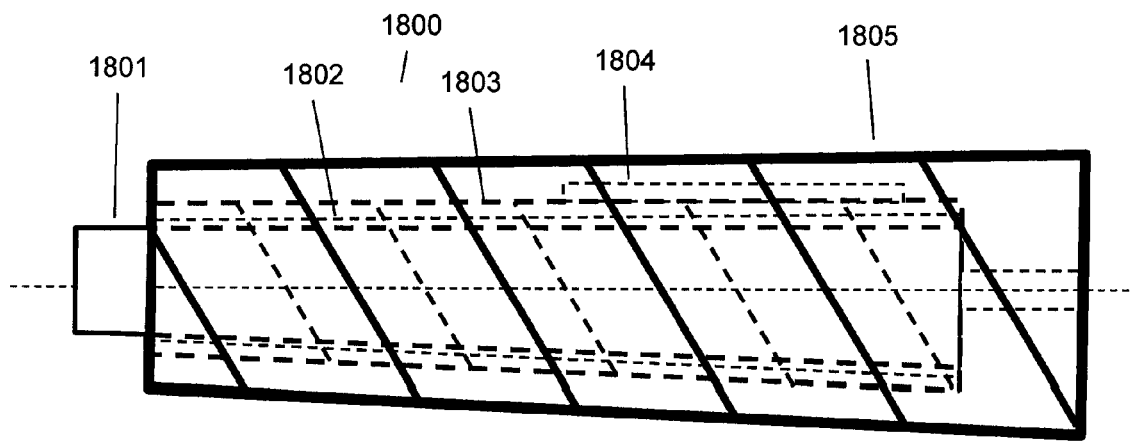

GOLF CLUB GRIP WITH RFID ASSEMBLY

This application claims priority to U.S. Provisional Patent Application No. 61/740,417 filed Dec. 20, 2012.

FIELD

Embodiments relate to sports, such as golf, and more particularly to golf club grips, and apparatuses and methods related to affixing radio frequency identification (RFID) tags to or in golf club grips.

BACKGROUND

Golf is a popular sport played with golf equipment including golf clubs and golf balls. Each golf club includes a head (the part that strikes the golf ball), a shaft, and a grip (the part where the golfer holds the club). When a golfer purchases a golf club it typically has the head, shaft and grip attached. It is common for the golfer to re-grip the golf club when the grip becomes worn over time. It is also common for a golfer to switch grips as a matter of preference of one type of grip over another. The golf club grip requires certain features, which will be discussed herein, in order to be installed properly onto the golf club shaft.

A golf club grip typically includes the following components: the grip walls (the part of the grip that surrounds (or wraps around) the shaft of the golf club), the end cap (the part of the grip that is above the end of the golf club shaft), and a drain hole (typically located in the center of the end cap). The drain hole serves an important purpose. When a grip is attached to a golf club, the installer typically uses double-sided adhesive (aka "grip tape") and a lubricant/oil. The lubricant is required for the installer to be able to slide the grip over the grip tape into the correct position on the golf club shaft. When the grip slides into position the lubricant needs a way to escape or it could get trapped in the shaft of the golf club. Further, without a drain hole there would be nowhere for the air to escape when the grip is installed onto the golf club shaft.

Due to advances in technology and the growing popularity of RFID technology, there are many possible applications for RFID in sports. In the sport of golf, there is known art related to attaching unique identifiers, including RFID tags, to golf clubs. For example, U.S. Pat. Nos. 5,844,483, 6,023,225, and U.S. Pat. No. 6,411,211 (Boley) discuss the concept of attaching unique identifiers and RFID tags to golf clubs. U.S. Pat. Nos. 8,226,495, D627,021, D649,609, D633,966, D649,610 and D664,619 (Savarese et al.) also discuss in detail various methods, apparatuses and designs for attaching or embedding RFID tags to golf grips and clubs. U.S. patent application Ser. No. 13/232,687 (Rose) discusses providing an air passage on the outside surfaces of an attachable tag in order to prevent air pressure build up and to prevent an attached tag from popping off during an impact of the golf club. However, existing manners of attaching a RFID tag to a golf club grip may compromise the functionality or aesthetics of the golf club grip.

SUMMARY OF THE DESCRIPTION

Apparatuses and methods relating to attaching, embedding, or otherwise affixing radio frequency identification (RFID) tags to or in golf club grips are described herein. It should be understood that although some of the embodiments are primarily related to golf club grips, other embodiments could be applied to grips attached to different objects as well.

In an embodiment, a radio frequency identification assembly is adapted to be coupled to a golf club grip. The radio frequency identification assembly may include a radio frequency identification (RFID) tag, a top part, and a bottom part. The RFID tag may include a substrate and a tag hole through the substrate, the top part may include a top hole through the top part along a top hole axis, and the bottom part may include a bottom hole through the bottom part along a bottom hole axis. In an embodiment, the RFID tag is positioned between the top part and the bottom part such that the top hole axis and the bottom hole axis intersect the tag hole. More particularly, the top hole, bottom hole, and tag hold may be in fluid communication.

In an embodiment, the top part is coupled with the bottom part at one or more locations lateral to the RFID tag. The RFID assembly may also include a post extending from the bottom part. The post may include a post hole through the post along a post hole axis, and the post hole axis may intersects the bottom hole. More particularly, the post hole and the bottom hole may be in fluid communication. Furthermore, the post may include one or more transverse slots through the post from an outer wall of the post to the post hole.

In an embodiment, the post may be transversely offset from the bottom hole. Furthermore, the RFID assembly may include a nub extending from the post, and the nub may be configured to pass through a hole in a golf club grip and to retain the RFID assembly within the golf club grip. In an embodiment, the nub includes a finger configured to flex transversely inward to pass through the hole in the golf club grip and to flex transversely outward to resist withdrawal from the golf club grip. In an embodiment, the RFID assembly may also include an alignment feature extending from the bottom part, and the alignment feature may be transversely offset from the bottom hole.

In an embodiment, a golf club grip is provided having a RFID tag and a grip. The RFID tag may include a substrate and a tag hole through the substrate, and the grip may include an end cap and a cap hole through the end cap along a cap hole axis. The RFID tag may be coupled with the grip such that the cap hole axis intersects the tag hole. More particularly, the cap hole and the tag hole may be in fluid communication. In an embodiment, the RFID tag is embedded within the end cap. In another embodiment, the RFID tag is otherwise affixed to the grip.

In an embodiment, the golf club grip includes a top part and a bottom part encasing the RFID tag. For example, the top part may have a top hole through the top part along a top hole axis, and the bottom part may have a bottom hole through the bottom part along a bottom hole axis. Accordingly, the RFID tag may be positioned between the top part and the bottom part such that the top hole axis and the bottom hole axis intersect the tag hole. More particularly, the top hole, the bottom hole, and the tag hole may be in fluid communication.

In an embodiment, the top part is coupled with the bottom part at one or more locations lateral to the RFID tag. In an embodiment, the grip includes a recess in the end cap in a direction of the cap hole axis, and the recess is configured to receive the RFID tag with an upper surface of the top part substantially coplanar with an outer surface of the end cap. The golf club grip may also include an adhesive layer between the RFID tag and the end cap. In an embodiment, the golf club grip may also include a post extending from the bottom part and transversely offset from the bottom hole. Furthermore, the grip may include a channel transversely offset from the grip hole. Accordingly, the post may be configured to engage the channel to secure the RFID assembly to the grip.

Methods of making golf club grips with RFID tags attached or embedded are described. In an embodiment, a method includes positioning a RFID tag relative to a grip such that a tag hole passing through a substrate of the RFID tag is axially aligned with a cap hole passing through an end cap of the grip. The method may also include coupling the RFID tag with the grip such that the tag hole is placed in fluid communication with the grip hole.

In an embodiment, positioning the RFID tag includes inserting the RFID tag into a grip mold, and molding the grip around the RFID tag within the grip mold.

In an embodiment, the method also includes positioning the RFID tag between a top part and a bottom part. The top part may have a top hole through the top part along a top hole axis and the bottom part may include a bottom hole through the bottom part along a bottom hole axis. Accordingly, the top hole axis and the bottom hole axis may intersect the tag hole. More particularly, the positioned RFID tag may include a tag hole placed in fluid communication with both the top hole and the bottom hole. The method may also include joining the top part with the bottom part such that the RFID tag is retained within a RFID assembly. The method may include inserting the RFID assembly into a recess formed in the end cap.

In an embodiment, the method may include molding the grip around a mold insert. The mold insert may include an insert hole through the mold insert along an insert hole axis, and the insert hole axis may intersect the cap hole. More particularly, the cap hole and the insert hole may be placed in fluid communication. The mold insert may include a channel transversely offset from the insert hole. The method may also include inserting a post of the RFID assembly into the channel. For example, the post may extend from the bottom part and may be transversely offset from the bottom hole, such that it aligns with and engages the channel. The method may also include aligning the bottom hole with the insert hole such that the tag hole is placed in fluid communication with the insert hole.

Several other embodiments of apparatuses and methods of attaching or embedding RFID tags to or in golf club grips are also described.

BRIEF DESCRIPTION OF THE DRAWINGS

The present invention is illustrated by way of example and not limitation in the figures of the accompanying drawings in which like references indicate similar elements.

FIGS. 3 and 3A respectively show a top view and a side cross-section view of a rectangular RFID tag with a hole in the middle.

FIGS. 4 and 4A respectively show a top view and a side cross-section view of a round RFID tag with a hole in the center.

FIGS. 4B and 4C respectively show a top view and a side cross-section view of a golf club grip with a round RFID tag embedded within the end cap area of the grip.

FIGS. 5 and 5A respectively show top views and side cross-section views of a round RFID tag in between two parts of round plastic, each piece with holes in the center.

FIGS. 5B and 5C respectively show a top view and side cross-section view of a RFID assembly.

FIGS. 6 and 6A respectively show top views and side cross-section views of a RFID assembly and a round piece of double-sided adhesive with a hole in the center.

FIG. 6B shows a side cross-sectional view of a RFID assembly installed in a recess of a golf grip.

FIG. 7 shows a side exploded view of three parts of a RFID assembly.

FIG. 7A shows a side view of a RFID assembly above a cross-section of a golf grip, the golf grip including a recess to receive the RFID assembly.

FIG. 7B shows side view of a RFID assembly installed in cross-section of golf grip with a recess to receive the RFID assembly.

FIG. 8 shows top views of three parts of a RFID tag assembly, including two plastic parts and a RFID tag.

FIG. 8A shows side cross-section views of three parts of a RFID tag assembly, including two plastic parts and a RFID tag.

FIG. 8B shows a side cross-section view of an assembled RFID tag assembly.

FIG. 9 shows a top view of a plastic part to be used as a mold insert inside a golf club grip mold.

FIG. 9A shows a side cross-section view of a plastic part to be used as a mold insert inside a golf club grip mold.

FIG. 9B shows a top view of a golf grip with plastic part (mold insert) molded into a golf club grip.

FIG. 9C shows a side cross-section view of a golf grip with plastic part (mold insert) molded into a golf club grip.

FIG. 9D shows a side cross-section view of a golf grip with plastic part (mold insert) molded into a golf club grip, and a RFID tag assembly attached to the golf club grip.

FIG. 9E shows a side cross-section view of a golf grip with plastic part (mold insert) molded into a golf club grip, and a RFID tag assembly attached to the golf club grip, illustrating the connection detail between the mold insert and the RFID assembly.

FIGS. 17A, 17B and 17C respectively show a side view of a golf club with a grip and two close-up views of the grip showing an embedded RFID tag on a substrate inside the grip exterior but outside the shaft of the club.

FIG. 18 shows a side view of a golf grip with layered, wrapped construction, with a RFID tag in between two layers of grip material.

DETAILED DESCRIPTION

Various embodiments and aspects will be described with reference to details set below, and the accompanying drawings will illustrate the embodiments. The following description and drawings are illustrative and are not to be construed as limiting the invention. Numerous specific details such as sizes and shapes are described to provide a thorough understanding of various embodiments. However, in certain instances, well-known or conventional details are not described in order to not unnecessarily obscure the present invention in detail.

In an aspect, embodiments of a golf club grip include grip walls, an end cap, a drain hole, and a RFID tag which is attached to or embedded in the end cap material. The embodiment may be configured to: 1) secure the RFID tag to the grip, 2) maintain the aesthetics of a typical golf club grip, 3) maintain the functionality of the grip drain hole, and 4) facilitate optimal communication between the RFID tag and RFID readers.

In an aspect, embodiments of a method include a RFID tag being embedded into the grip of a golf club at the time the golf club grip is molded. The RFID tag may positioned in the butt-end of the grip and/or within the end cap area of the grip, with the plane of the RFID tag perpendicular to the shaft of the golf club. The grip drain/vent hole may be located in the center of the grip and the embedded RFID tag may include a hole in the center allowing the grip drain hole to appear and function as it normally would.

Figure 1:
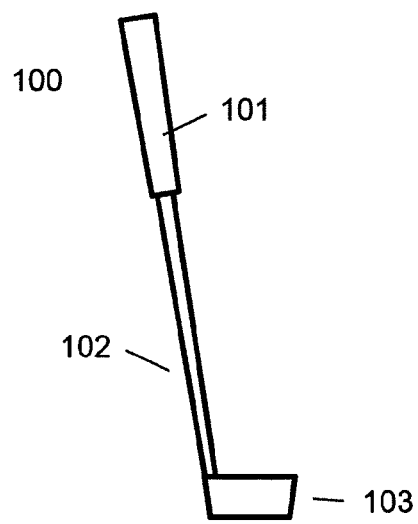
FIG. 1 shows a side view of a golf club.

FIG. 1 shows an example of a golf club 100, with a grip 101, a shaft 102 and head 103. The grip 101 is at the "butt-end" or handle end of the golf club. Golf grips come in various sizes and shapes and can be made of various materials. Grips are commonly made of rubber, but can be made of leather, synthetic leather, and various other materials. There are "one piece" grips and grips comprised of various layers of material. Grips can be manufactured by molding and curing (i.e. vulcanizing) rubber material, using high heat and pressure, into a desired shape. Grips can also be manufactured by wrapping layers of material including, for example, foam and leather, around a base material to form a finished grip.

Figure 2:
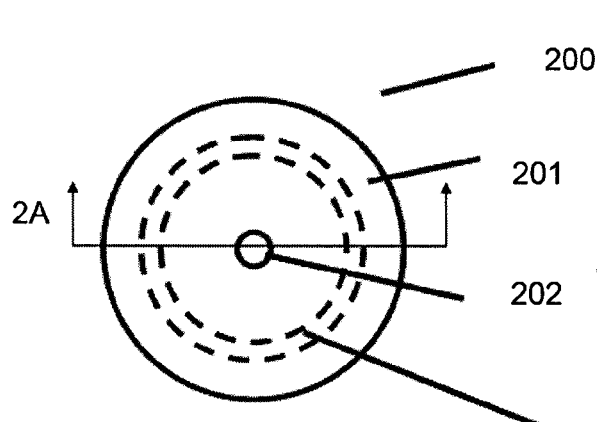
FIGS. 2 and 2A respectively show a top view and a side cross-section view of a golf club shaft and grip.
Figure 2A:
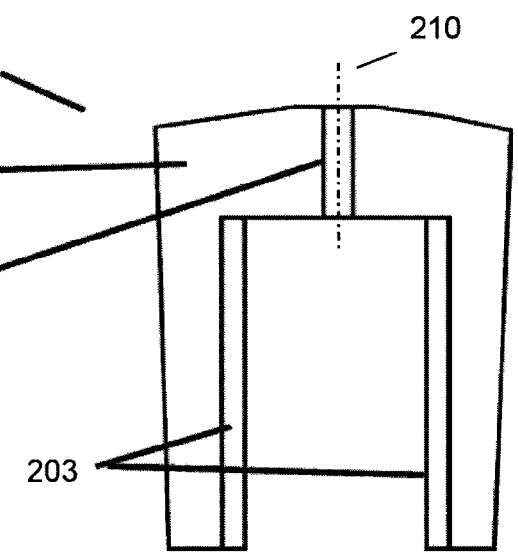

FIGS. 2 and 2A show the top portion of a typical golf club shaft and grip 200. The shaft 203 of a golf club is commonly made of metal or graphite material and is hollow in the center. The grip slides over the shaft of the club such that the "end cap" 201 is above the end of the shaft when installed. The grip includes a cap hole 202 for drainage and ventilation. The cap hole may pass through the end cap 201 along a cap hole axis 210. The cap hole 202 is an important feature of the grip because without it installation of the grip onto the shaft would be difficult if not impossible.

RFID technology has become popular over the years and there are numerous potential applications using RFID in sports, including golf. FIGS. 3 and 3A show an example of a RFID tag 300. A tag consists of a chip or integrated circuit 302 which includes a unique identifier, an antenna 304 and a substrate material 303. The chip and the antenna are connected using conductive material and the combination of the connected chip and antenna on a substrate is referred to as an inlay or tag. RFID inlays typically are provided as either "wet" (with adhesive on the substrate) or "dry" (no adhesive on the substrate). Herein the terms "tag" and "inlay" are used interchangeably. There are various types of RFID tags, including active (with battery), semi-active, and passive (no battery), to name a few. The description herein will focus primarily on passive RFID tags but it is understood that the concepts covered herein could apply to the use of any type of RFID tag. It is possible the concepts described herein could employ technologies other than RFID, including any technology that can include a unique identifying means in a "tag". Magnetic strip technology would be one example of such other technologies that could include a unique identifier in a tag.

The tag 300 shown in FIGS. 3 and 3A is rectangular but tags can come in all shapes and sizes. This particular example of a tag includes a tag hole 301 in the center of the substrate of the tag. The tag hole 301 may pass through the entire RFID tag, including the substrate, along a tag hole axis 310. In one exemplary embodiment, this hole is an important feature that serves an important function. FIGS. 4 and 4A show an example of a round RFID tag 400 with a tag hole 401 through the substrate, chip 402 and/or antenna 403. Embodiments described herein can make use of various shapes of RFID tags, the shapes shown in FIGS. 3, 3A, 4, and 4A are for example purposes only.

In an embodiment, a RFID tag can be molded directly into the end cap area of a golf grip such that the RFID tag is perpendicular to the shaft of the golf club. FIGS. 4B and 4C show a RFID tag 400 with a tag hole 401 embedded in a golf club grip 404 such that the tag hole 401 in the RFID tag is aligned with the cap hole 402 in the end cap of the grip. Thus, in an embodiment, a cap hole axis, e.g., cap hole axis 210, may be collinear with a tag hole axis 310. That is, a tag hole 401 and a cap hole 402 may be concentric. In other embodiments, tag hole 401 and cap hole 402 may be aligned or in fluid communication, but the perimeter of the holes may be offset or non-concentric.

In the configuration in which the RFID tag is molded directly into a rubber grip at the time of grip manufacture, the RFID tag may have special requirements. For example, the tag may require the connection between the RFID chip and antenna may be strong enough to withstand the high heat and pressure of the rubber molding process. One known technique for this is soldering the chip leads to the antenna versus using conductive adhesive. Conductive adhesive connections are typically not able to withstand high heat as well as soldered connections do. Further, a tag intended to be molded into rubber where high heat is involved would likely have a thicker substrate material and/or be "laminated" with a protective material. Various types of materials, such as polyethylene terephthalate (PET) and different plastics are typically used as substrate and/or laminate material. The configuration shown in FIG. 4C (and similar configurations) allows air, liquid, etc. to pass through the grip, which may be important to the proper installation of the grip. Further, this configuration can be important during general use of the grip when it is attached to a golf club. For example, when a golf club is in use, if the attached grip is configured such that air cannot escape during use of the golf club, the air trapped inside the golf club shaft may react to the impact of the club on a golf ball, potentially creating vibrations and/or sounds that are not acceptable to the golfer.

In an embodiment, the RFID inlay or tag can be built into a RFID tag assembly. This RFID tag assembly can also be generally referred to as a RFID tag. FIGS. 5 and 5A show the parts of a RFID assembly 504, including a top part 501, the RFID tag 502 and a bottom part 503. Top part 501 may include a top hole passing through top part 501 along a top hole axis 510. Similarly, bottom part 503 may include a bottom hole passing through bottom part 503 along a bottom hole axis 512. As described above, RFID tag 502 may have a tag hole passing through RFID tag along a tag hole axis 514. Furthermore, as discussed above, top hole axis 510, bottom hole axis 512, and tag hole axis 514 may be collinear, or they may be at different angles to each other and misaligned.

In an embodiment, one or more of the holes passing through the top part 501, bottom part 503, and RFID tag 502 may have a circular cross-sectional area. In alternative embodiments, one or more of the holes may be non-circular. For example, the tag hole may be circular, while the top hole may have a cross-sectional area that is shaped as a star, a square, a recognizable character, e.g., a logo, etc.

These parts can be assembled together to become one RFID tag assembly 500, as shown in FIGS. 5B and 5C. There could be additional layers of material (not shown). For example, a layer could be added on top of the top part 501, such as an additional layer including a different hardness and/or texture (e.g. a softer durometer material to match the feel of a golf grip). Several methods can be used to connect the parts 504 into one tag assembly 500. For example, in an embodiment, a RFID inlay can be positioned between two plastic parts and the two plastic parts connected using ultrasonic welding. Other connection methods and techniques can be used including, but not limited to: spin welding, use of pressure sensitive adhesives (PSAs), use of liquid adhesives, etc. The plastic parts could be designed to snap together or screw together, etc. The inlay used can be wet or dry, laminated or not laminated, with a conductive adhesive chip-to-antenna connection or other (e.g. soldered connection). The parts 501, 502, and 503 (collectively the tag assembly parts 504) may each contain a hole through the center of the material for reasons discussed above.

In an embodiment, top part 501 and bottom part 503 include features to facilitate joining one part to the other. For example, one part may include a recess or channel and the other part may include a corresponding peg or post that snaps or presses into the channel. Thus, the parts may be joined by an interference or resistance fit. Alternatively, one or more raised portions or lips may be provided along an outer edge of the parts, or along an inner edge near the holes passing through the parts. Thus, in an embodiment, top part 501 and bottom part 503 may be joined in at least one location lateral to the encased RFID tag 502. These raised portions may be appropriately flat and dimensioned to contact one another when the parts are brought together. Thus, an ultrasonic welder may be used to join the parts together at the raised portions or lips.

FIGS. 5B and 5C show the assembled RFID tag assembly 500. It should be understood this tag assembly could be manufactured in other ways, including injection molding plastic around the RFID tag. In an embodiment, parts 501 and 503 may be plastic. In other embodiments, parts 501 and 503 may be formed from other materials, such as ceramics, polymeric composites, or other non-metallic materials. Furthermore, each of part 501 and 503 may be formed from different materials. For example, bottom part 503 may be a plastic while top part 501 may be ceramic to provide a unique aesthetic, e.g., constrast, to the assembled golf club grip with RFID assembly. In an embodiment having top part 501 and bottom part 503 formed from dissimilar materials, adhesives may be used to join the parts.

FIGS. 6 and 6A show an assembled RFID tag assembly 600 (same as 500) and a piece of double-sided pressure sensitive adhesive 601, both with a hole in the center. In one embodiment, the tag assembly 600 can be attached to a golf grip using a pressure sensitive adhesive 601 positioned between the tag assembly 600 and the grip 602, as shown in FIGS. 6, 6A and 6B. Ideally, the PSA would be formulated to bond very well to the material of the grip 602 and to the material of the tag assembly 600, such that the golfer cannot easily remove the tag 600 from the grip 602. FIG. 6B shows the tag assembly 600 installed inside a golf grip 602 using PSA 601, forming finished grip assembly 603. The golf grip 602 is designed to include a recessed area to receive the tag assembly 600, such that the assembled grips have the appearance (and functionality) of a regular golf grip.

It may be desirable for the RFID tag to be permanently affixed to the golf grip. Various designs are possible, providing permanent, semi-permanent or temporary attachment of the RFID tag to the golf grip. In one embodiment, the RFID tag is molded directly into the grip during the grip manufacturing process. This embodiment would be considered permanent attachment of the RFID tag to the grip. In configuration 603 shown in FIG. 6B, the attachment of the RFID tag relies on the strength/formulation of the adhesive between the grip and the tag. This may allow for relatively easy removal of the RFID tag, which may be undesirable.

In another embodiment, additional features can be added to the RFID tag assembly to allow for more permanent attachment of the RFID tag while maintaining the aesthetics and functionality of the grip. FIGS. 7, 7A and 7B show a configuration similar to the configuration shown in FIGS. 5, 5A and 5B (for example, configuration 500) except in the configuration 700 the bottom plastic part 703 includes features that allow the tag assembly to pass through the drain hole in the grip and "grab" or "lock onto" the bottom side of the end cap.

As shown in FIG. 7, the configuration 700 consists of a top part 701, RFID tag 702, and bottom part 703. Bottom part 703 may further be segmented into various constituent portions, such as a top portion 704, post feature 705 extending from top portion 704, and pointed "nub" feature 706 extending from post 705. It should be understood that the shapes and sizes of such a tag can vary, and the figures included herein shall not be construed to limit the invention. For example, the post and nub features could be different in many ways but achieve the same objective. In an, the post feature 705 is designed to flex as the tag assembly is inserted into the grip assembly and the nub 706 is design to be rigid. The opposite could also work for these features. For example, the post 705 could be designed to be rigid and the nub feature 706 could be designed to include reversibly deformable "fingers" that flex when passing through the grip assembly then return to their original form. More specifically, nub 706 may include two or more fingers, e.g., having triangular cross sections as shown, that are separated from each by transverse slots and thus can flex transversely inward toward hole axis 720 or transversely outward away from hole axis 720. In other words, nub 706 may include a collet-like structure. However, rather than being used to expand around an object, nub may be configured to reduce in outer dimension to insert a narrow distal end through a hole in an end cap of a golf club grip, and then to expand outward such that a wider proximal end surface of the fingers may press against a lower surface of the end cap and thereby retain RFID assembly within golf club grip.

In another embodiment, nub 706 may be formed from a resilient material, such as an elastomer, that has sufficient resilience to compress radially inward to pass through a hole in an end cap of a golf club grip and then to spring outward to a larger dimension to resist withdrawal from the end cap hole. The functionality (i.e. maintaining the aesthetics and functionality of the grip) may be similar in each embodiment.

FIG. 7A shows a side view of an assembled tag assembly 707 over a side view cross-section of the top portion of a golf grip 709 and golf club shaft 710. The post 705 has a large enough diameter to allow for a through hole 708 to pass through the entire tag assembly. In one embodiment, the through hole would be approximately the same diameter as the diameter of a typical golf club grip drain/vent hole (i.e. approximately 2-3 mm). The grip 709 includes a recessed area 711 designed to accommodate the tag assembly 707. The drain hole 712 has a larger diameter than the diameter of a typical golf club drain hole in order to accommodate the post 705 and nub 706 of the tag assembly 707. FIG. 7B shows a finished grip assembly 713 consisting of a tag assembly 707 installed into a grip 709. In one embodiment, an important feature of the tag assembly is an opening or slot in at least one side of the nub feature 706 and post feature 705. FIG. 7 shows an example where both the nub 706 and post 707 include openings on two sides, which also could be described as a notch in the post and nub. This opening is labeled 706A in FIGS. 7 and 7B. The opening or slot 706A in the post 705 and nub 706 allows for liquid to escape from the grip and/or golf club shaft during installation of the grip. The opening 706A also allows for drainage during use of the golf club and prevents pooling of any liquid in the shaft of the golf club (e.g. if the club is situated such that the butt-end is facing down). If the opening or slot 706A was not included, some amount of liquid could pool inside the shaft of the golf club. In one embodiment, the opening or slot starts at the pointed end of the nub 706 and continues to the point where the opening meets the bottom of the grip end cap—indicated in FIG. 7B as dimension A (note: this configuration is not shown in FIG. 7-7B). In another embodiment, as shown in FIGS. 7, 7A and 7B, the opening 706A can continue further, for example from the pointed end of the nub 706 to the underside of part 704. In this example, the opening or notch would have the dimension of A+B, as shown in FIG. 7B. This increased length may allow for some flex in the post 705 as it is being installed into the grip 709, allowing the post structure to partially collapse as it passes through the opening 712 in the grip and when the nub 706 passes the bottom of the end cap the post structure expands back to its original shape, locking the tag assembly 707 into the grip 709.

Opening 706A may include axial and transverse segments. For example, a post hole may pass through post 705 along a post hole axis 720. The post hole axis 720 may be collinear with a central axis of post 705, or it may be off-centered from post 705. Thus, the post hole 720 may be a concentrically formed hole, providing post 705 with an annular cross-sectional area, or alternatively, the post hole may form a notch along at least one side of post 705, providing post 705 with a convex cross-sectional area, e.g., a substantially C-shaped form.

In an embodiment, the post hole may extend to and intersect the bottom hole formed in a bottom part of a RFID assembly, e.g., bottom part 703.

In an embodiment, opening 706A also includes a transverse slot passing from an outer wall of post 705 to the post hole. For example, a transverse slot may be directed perpendicular to the post hole axis 720. In an embodiment, this provides for a non-linear fluid path from the inside of golf club shaft 710 through the tag hole. Accordingly, a distal end of nub 706 may be solid and pointed, i.e., providing a fluid barrier, since fluid may pass transversely from shaft 710 through a transverse slot and then upward along post hole axis 720 through the post hole and into a bottom hole of the bottom part.

In an embodiment, parts 701 and 703 may be plastic. In other embodiments, parts 701 and 703 may be formed from other materials, such as ceramics, polymeric composites, or other non-metallic materials. Furthermore, each of part 701 and 703 may be formed from different materials. For example, bottom part 703 may be plastic to enhance flexibility and/or strength of nub 706, while top part 701 may be ceramic to provide a unique aesthetic, e.g., contrast, to the assembled golf club grip with RFID assembly.

In another embodiment, parts can be molded directly into the structure of the golf club grip at the time of manufacture. FIGS. 8, 8A and 8B show parts 800 of a RFID assembly designed to attach to a golf club grip assembly with such embedded part (mold insert) to facilitate proper attachment of the RFID tag assembly to the grip assembly. Part 801 is a top part of the RFID assembly, which could be made of plastic or another material and which could optionally have additional layers of material or finishes attached, as described earlier herein. The RFID tag 802 may be positioned in between the top part 801 and the bottom part 803. All parts may have a through hole in the center. The parts can be connected together using various means, as previously described, to form a RFID assembly 804 as shown in FIG. 8B.

In an embodiment, bottom part 803 may include one or more post features extending from the bottom part 803. The post feature may be a boss, peg, or other protrusion that is transversely offset from a bottom hole passing through a bottom part, e.g., bottom part 803. Alternatively, the post feature may have a geometric form, e.g., a circular or rectangular form that encompasses the bottom hole. For example, the post feature may be an annular boss that extends from bottom part 803 such that the annular wall of the post feature creates a recess when viewed from the bottom and the bottom hole is within the recess. The post feature may be configured to insert into a matching channel formed in a golf club grip.

FIGS. 9 and 9A show a part 900 designed to be molded directly into the golf club grip material. Part 900, which could be made of plastic or other material, has a through hole 901. FIG. 9B shows a top view of a grip assembly 902 with part 900 molded directly into the material of the grip. FIG. 9C shows a side cross-section view of a grip assembly 902 with part 900 molded directly into the material of the grip. After the grip 902 has been manufactured with the embedded mold insert 900, a RFID assembly 903 (similar to 804) can be attached to the grip assembly 902. In one embodiment, as shown in detail 9D-1, an adhesive 904 can be used to attach the RFID assembly 903 to the grip assembly 902 by adhering surfaces of the mold insert 900, e.g, a channel surface, to the RFID assembly 903, e.g., a post feature surface. The adhesive 904 can be a variety of materials, for example cyanoacrylate (aka "Superglue"), PSA or other bonding material. The use of a mold insert 900 and adhesive material 904 to connect the RFID assembly 903 to the grip assembly 902 may make for a more permanent final grip structure.

It should be understood that the potential connection types, including various different shapes, sizes and configurations are possible using an embedded plastic part 900 and a tag assembly 903. For example, the connection type between these two parts could be a "snap" connection, a "threaded" connection, a rivet connection, etc. FIG. 9E identifies an area 905 that could have several different connection designs but it should be understood that parts 900 and 903 could also be designed differently than as shown in FIGS. 9-9E.

Figure 10:
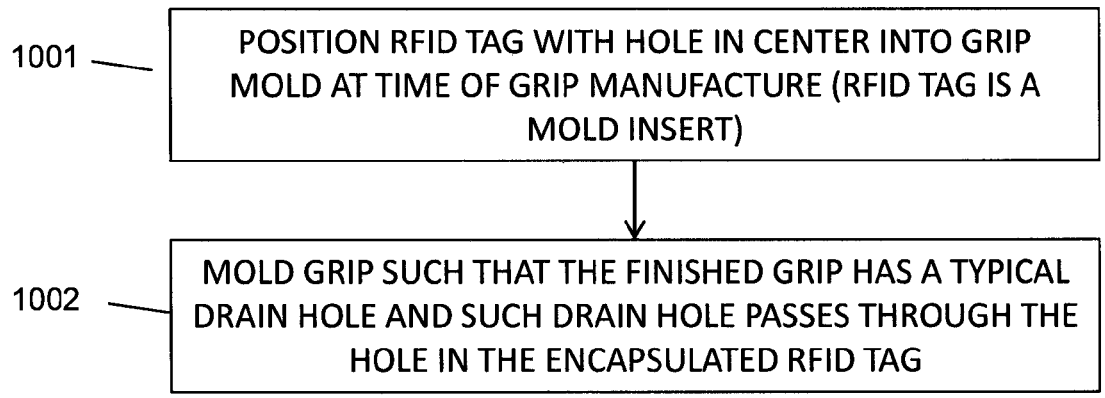
FIG. 10 is a flow chart describing a method of manufacturing a golf club grip with an embedded RFID tag.

FIG. 10 is a flow chart describing a method of manufacturing a golf club grip with an embedded RFID tag. In this embodiment, the RFID tag is a "mold insert" and is embedded into the grip material as the grip is molded, maintaining the aesthetics and functionality of a typical grip, especially the functionality of the drain or vent hole. At operation 1001, a RFID tag having a hole passing through the RFID tag thickness may be positioned in a grip mold. The RFID tag may be so located prior to injecting a grip material into the mold, and thus, may be considered to be a mold insert. At operation 1002, the grip material may be injected into the grip mold to mold the grip. The grip mold may include features that result in the molded grip having a typical drain hole passing through an end cap of the grip. Furthermore, the drain hole may pass through the hole in the RFID tag. Thus, a resulting club grip may include an embedded and/or encapsulated RFID tag having a tag hole in fluid communication with a drain hole through the end cap.

Figure 11:
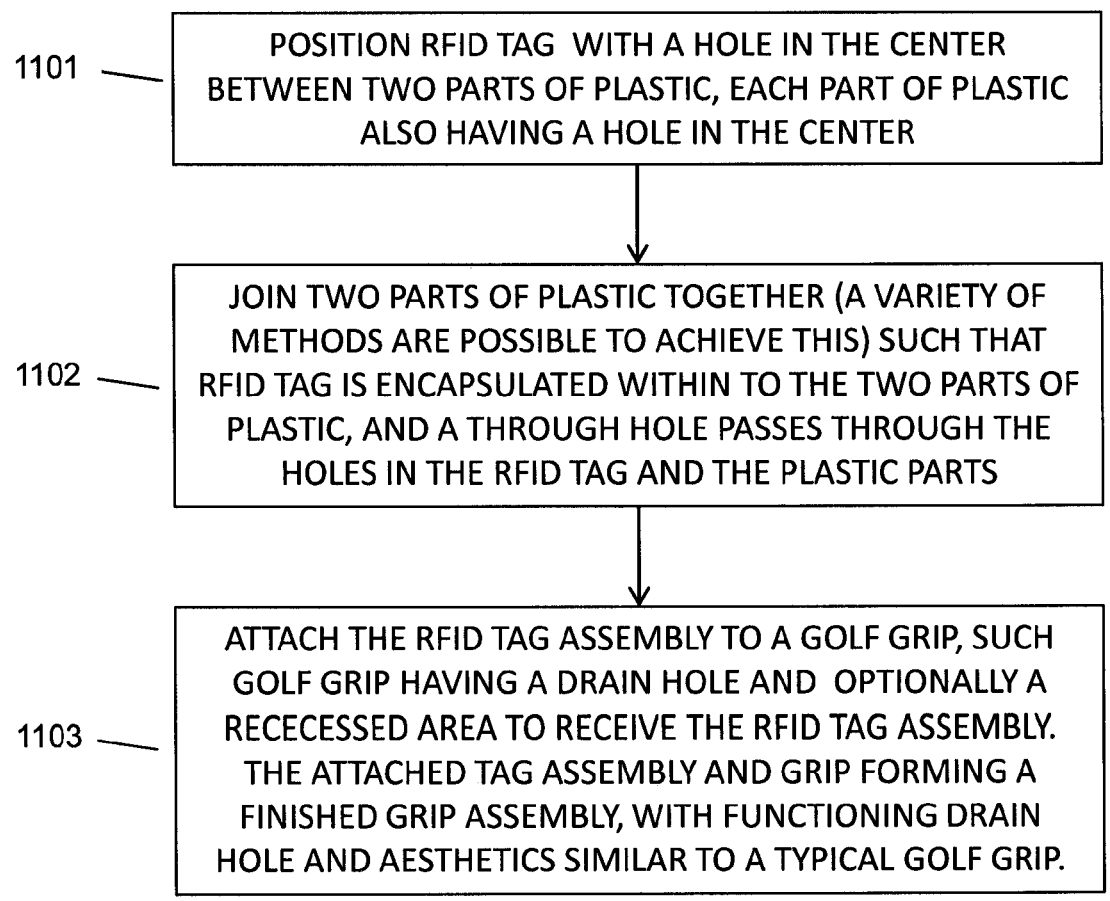
FIG. 11 is a flow chart describing a method of attaching a RFID tag assembly to a golf club grip.

FIG. 11 is a flow chart describing a method of attaching a RFID tag assembly to a golf club grip. In this embodiment, a "tag assembly" is formed by surrounding a RFID tag with other material, such as plastic. The tag assembly is then attached to a grip using various methods, including for example, the addition of features to the tag assembly that enable to lock onto the grip assembly. At operation 1101, a RFID tag having a hole passing through the RFID tag thickness may be positioned between, e.g., top part 501 and bottom part 503. At operation 1102, the top part and bottom part may be joined at one or more locations such that the RFID tag is encased, encapsulated, and/or otherwise retained between the top part and bottom part. For example, the top part may be thermally or adhesively welded to the bottom part along an edge lateral to the RFID tag. After joining the top part and bottom part, a hole in the RFID tag may be aligned with holes passing through the top part and the bottom part. The RFID tag retained between the top part and the bottom part may be referred to as a RFID assembly. At operation 1103, the RFID assembly may be attached to a club grip such that a drain hole through an end cap of the club grip is placed in fluid communication with the holes passing through the RFID assembly. In an embodiment, the club grip may include a recess, e.g., recessed area 711, to receive the RFID assembly. The RFID assembly may be inserted into the recess and retained therein through various manners of securement, including interference fits, adhesive bonds, snap fits, etc. Furthermore, an upper surface of the RFID assembly may be flush with an upper surface of the end cap to provide the finished grip assembly with an aesthetic similar to a typical golf club grip.

Figure 12:
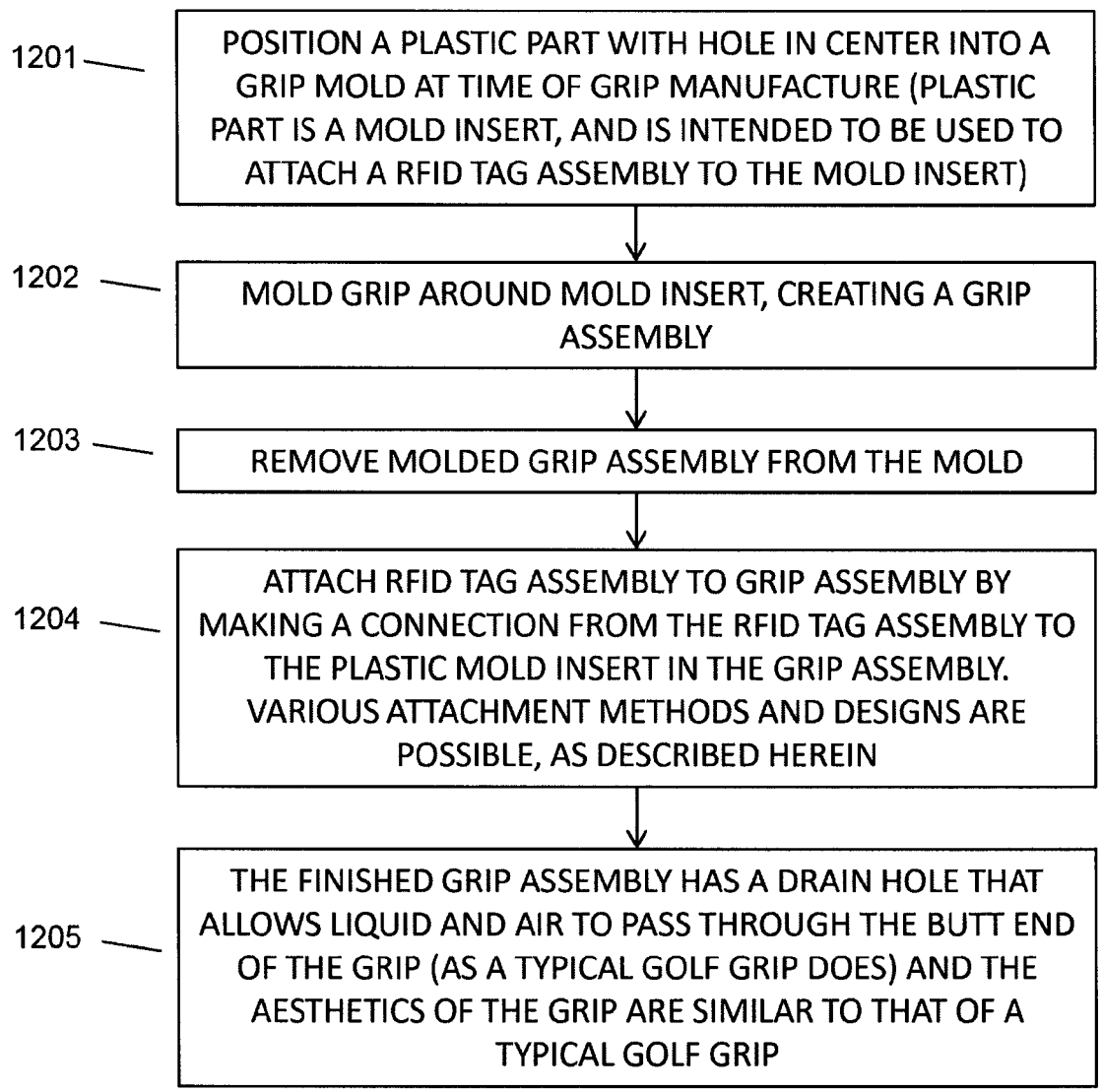
FIG. 12 is a flow chart describing a method of attaching a RFID tag assembly to a golf club grip using a mold insert in the golf club grip.

FIG. 12 is a flow chart describing a method of attaching a RFID tag assembly to a golf club grip using a mold insert, which may be formed from plastic or another material, in the golf club grip. In this embodiment, a part is molded into the grip at time of manufacture, as described in 1201. Then a RFID tag assembly is attached to the mold insert, as described in 1204. At operation 1201, a mold insert may be positioned within a grip mold. The mold insert may include an insert hole passing through the insert. For example, the insert hole may pass axially through the mold insert such that it aligns with mold features for forming an end cap hole in a golf grip end cap. At operation 1202, a golf grip may be molded around the mold insert. The molded golf grip may therefore include a mold insert having an insert hole axially aligned with the end cap hole and/or the grip hole through which a grip shaft is inserted. At operation 1203, the golf grip may be removed from the mold. The mold insert may include a channel, counterbore, or other feature that recesses into the insert and is exposed toward an upper surface of the golf grip end cap. Thus, at operation 1204, a RFID assembly having, for example, a post extending from a bottom part, may be connected to the mold insert. For example, the post may be engaged with the channel. An example is shown above in FIG. 9D, in which a circular boss concentric about a hole through a center of a RFID assembly may be engaged with a circular channel formed in a mold insert concentrically about an insert hole. The post, boss, etc. of the RFID assembly may connect with the channel, relief, counterbore, etc. of the mold insert in various manners, including through snap fits, press fits, adhesive and/or thermal welds, etc. In an alternative embodiment, the post may be formed on the mold insert and the receiving channel may be formed in the RFID assembly. At operation 1205, the finished grip assembly having the golf club grip engaged with the RFID assembly may be provided with an aesthetic similar to that of a typical golf club. For example, the hole passing through the RFID assembly may be in fluid communication with the hold passing through the mold insert and the grip, allowing for liquid and air to pass through the butt end of the grip.

Figure 13A:
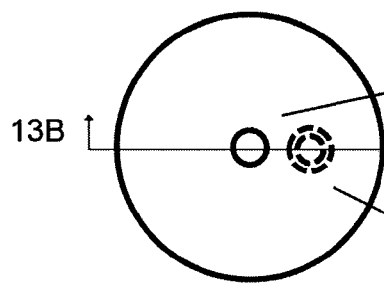
FIGS. 13A and 13B respectively show a top view and a side cross-section view of a RFID tag assembly with an offset post feature on the underside.
Figure 13B:
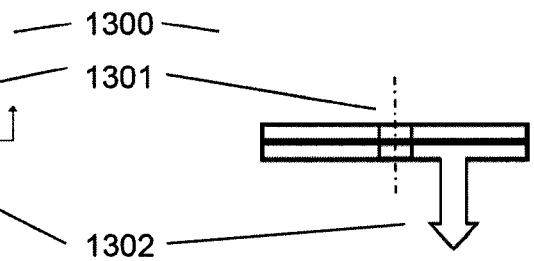
Figure 13C:
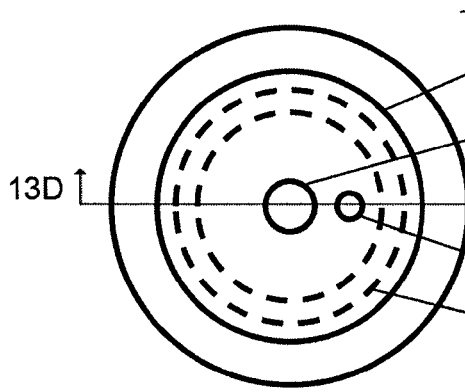
FIGS. 13C and 13D respectively show a top view and a side cross-section view of a portion of a grip and shaft with a recessed area to receive a RFID assembly and an offset through hole to receive a post feature.
Figure 13D:
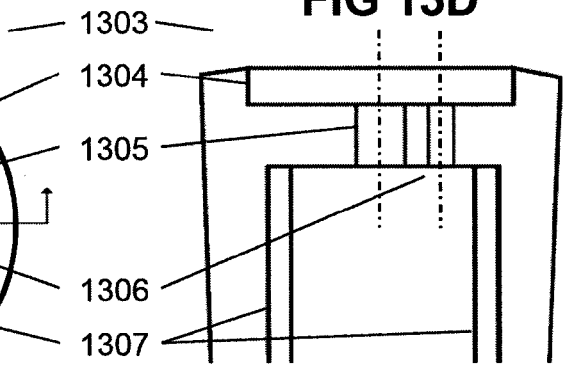
Figure 14A:
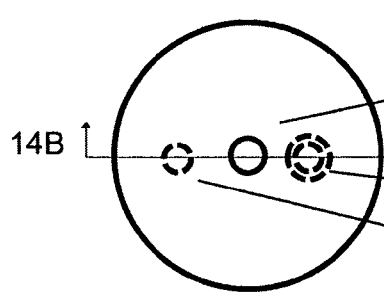
FIGS. 14A and 14B respectively show a top view and a side cross-section view of a RFID tag assembly with an offset post feature and an offset alignment feature on the underside.
Figure 14B:
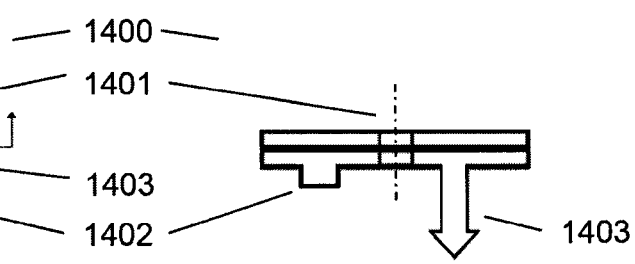
Figure 14C:
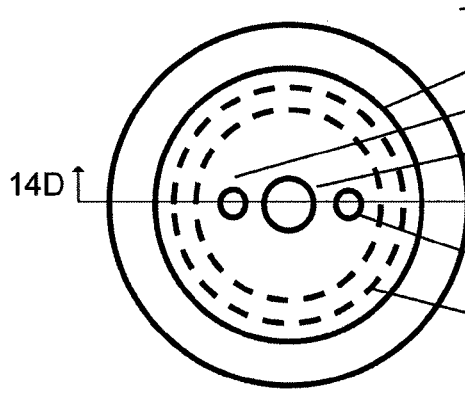
FIGS. 14C and 14D respectively show a top view and a side cross-section view of a portion of a grip and shaft with a recessed area to receive a RFID assembly and an offset through hole to receive a post feature and an offset recess to receive an alignment feature.
Figure 14D:
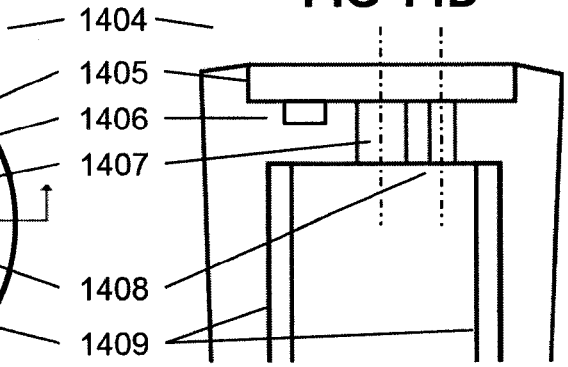
Figure 15A:
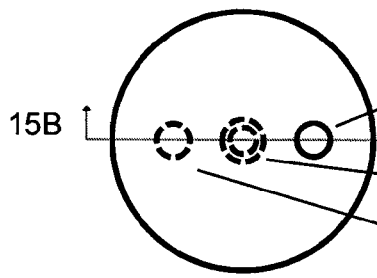
FIGS. 15A and 15B respectively show a top view and a side cross-section view of a RFID tag assembly with an offset alignment feature, a post feature on the underside in the center, and an offset through hole for drainage and ventilation.
Figure 15B:
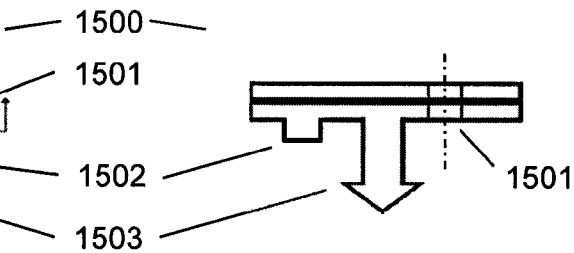
Figure 15C:
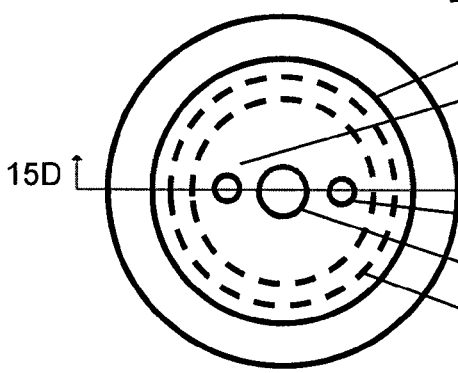
FIGS. 15C and 15D respectively show a top view and a side cross-section view of a portion of a grip and shaft with a recessed area to receive a RFID assembly, an offset recess to receive an alignment feature, a through hole to receive a post feature and an offset through hole for drainage and ventilation.
Figure 15D:
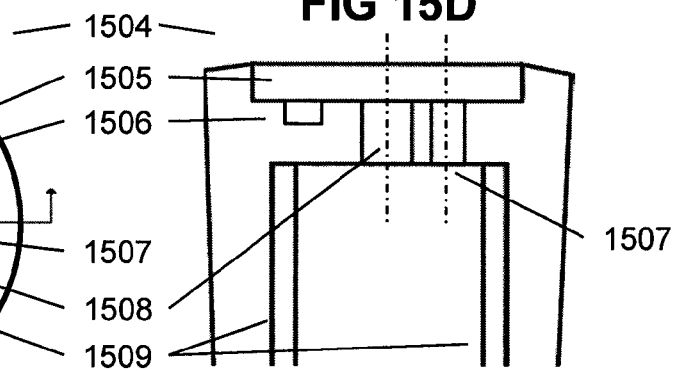
Figure 16A:
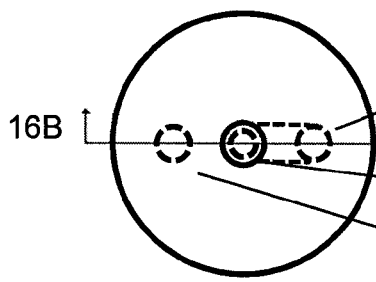
FIGS. 16A and 16B respectively show a top view and a side cross-section view of a RFID tag assembly with an offset alignment feature, a post feature on the underside in the center, and a through hole for drainage and ventilation that starts in an offset position on the underside of the tag assembly and ends in the center on the top side of the tag assembly.
Figure 16B:
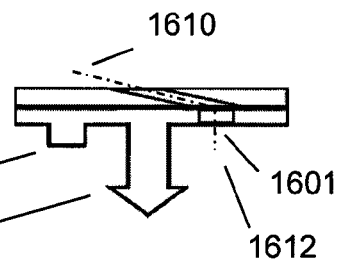
Figure 16C:
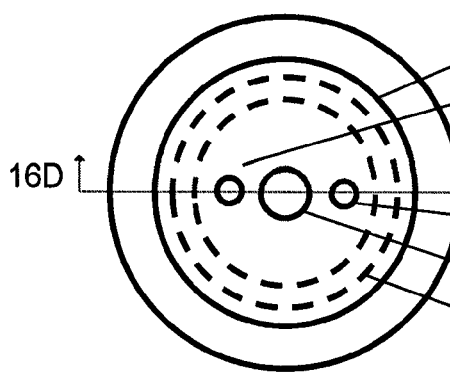
FIGS. 16C and 16D respectively show a top view and a side cross-section view of a portion of a grip and shaft with a recessed area to receive a RFID assembly, an offset recess to receive an alignment feature, a through hole to receive a post feature and an offset through hole for drainage and ventilation.
Figure 16D:
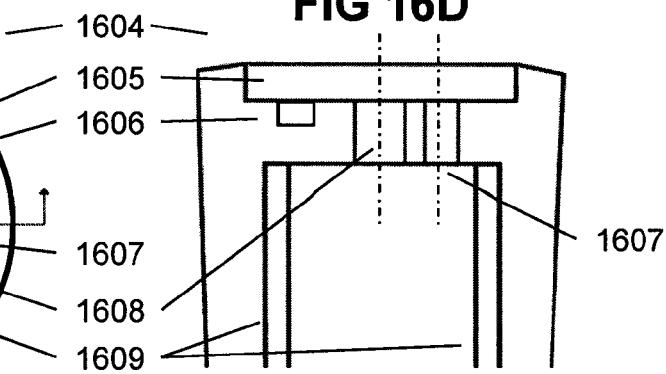

FIGS. 13A-16D show examples of configurations of RFID tag assemblies designed to attach to grip assemblies, per the method described in FIG. 11. FIGS. 13A and 13B shows a tag assembly 1300 with an offset post feature 1302 on the underside of the tag assembly and a through hole 1301 in the center of the tag assembly. FIGS. 13C and 13D show a grip assembly 1303 having a golf club grip positioned over a golf club shaft 1307. The golf club grip may include a recessed area 1304 designed to receive a RFID assembly. A through hole 1305 is positioned in the center of the grip for drainage and ventilation and an offset through hole 1306 is included to receive a post feature. In use, the tag assembly 1300 can be attached to the grip assembly 1303 by positioning the tag assembly over the grip assembly and inserting the post 1302 into and through hole 1306, forming, in one embodiment, a semi-permanent finished grip assembly with integrated RFID tag.

FIGS. 14A-14D show a configuration similar to that shown in FIGS. 13A-13D with the additional element of an alignment feature 1402 and a recess 1406 designed to receive the alignment feature. The alignment feature can help secure the RFID assembly in position and the recess 1406 could receive a drop of liquid adhesive before connecting the tag assembly, in one embodiment, to make the connection between the RFID tag assembly 1400 and grip assembly 1404 more permanent.

In an embodiment, the alignment feature may be a boss, peg, or other protrusion extending from a bottom part of the RFID assembly 1400. The alignment feature may be tapered, such that a distal end has a smaller cross-sectional dimension or area than a proximal end of the alignment feature. The alignment feature may be transversely offset from the tag hole 1401 passing through the RFID assembly 1400. Furthermore, the alignment feature may be transversely offset from the post 1403 extending from the bottom part. Thus, with the tag hole 1401 aligned with, e.g., end cap hole 1407, and alignment feature 1402 engaged with alignment recess 1406 and the post 1403 engaged with channel 1408, lateral and rotational movement of the RFID assembly 1400 within recess 1405 is resisted. More specifically, alignment feature 1402 and post 1403 create two points of contact within the golf club grip to resist lateral or rotational motion.

In an embodiment, the golf club grip configured to be positioned over golf club shaft 1409 includes a recess or counterbore 1405 sized to receive the RFID assembly. For example, RFID assembly 1400 may be pressed into recess 1405 such that an upper surface of a top part of RFID assembly is substantially flush with an outer, e.g., a top, surface of an end cap of the golf club grip. Thus, the RFID assembly may include a surface that is substantially coplanar, or within 1-2 mm of coplanar in either a raised or recessed position, relative to a surface of the golf club grip. Accordingly, the assembled golf club grip with RFID assembly may have an aesthetic similar to a typical golf club. Furthermore, when the RFID assembly is slightly recessed, e.g., about 1 mm below the coplanar position, the RFID assembly may be protected from impact and damage.

FIGS. 15A-15D show a configuration of a RFID assembly 1500 similar to that shown in FIGS. 14A-14D with the exception that the tag hole 1501, described above as being located in the center of a golf club grip, is laterally offset from the center. RFID assembly 1500 may also include an alignment feature 1502 and a post 1503 to engage and retain the RFID assembly within a mating golf club grip 1504. For example, the golf club grip, which may be placed over golf club shaft 1509, may include a channel 1507 to receive post 1503 and a counterbore 1506 to receive alignment feature 1502. Furthermore, the golf club grip may include recess 1505 to receive RFID assembly in a substantially flush position. This configuration would function properly but would appear different than typical golf grips due to the offset drain hole. More specifically, the aesthetic of the assembled golf club grip with RFID assembly would include end cap hole 1507 laterally offset from the center of shaft 1509, and given that end cap hole 1507 may align with tag hole 1501, the drain hole of the assembly may visually offset from the center of the club grip end cap.

FIGS. 16A-16D show a configuration similar to that shown in FIGS. 15A-15D with the exception that the offset tag hole 1601 includes features to position the drainage path such that when the through hole 1601 exits the top part of the tag assembly 1600 it is located in the center of the tag assembly. This can be achieved in several ways, including forming a channel in the top part of the tag assembly. This configuration would have the aesthetics of a typical golf grip, with the drain hole in the center of the grip.

In an embodiment, RFID assembly 1600 includes a top part having a top hole through the top part along a top hole axis 1610. Similarly, RFID assembly 1600 includes a bottom part having a bottom hole through the bottom part along a bottom hole axis 1612. Likewise, a RFID tag sandwiched between the top part and the bottom part may have a tag hole that is intersected by both the top hole axis 1610 and the bottom hole axis 1612. Accordingly, tag hole 1601 may follow any direction along top hole axis 1610 and bottom hole axis 1612, e.g., tag hole 1601 represents several holes having different axial directions that are placed in fluid communication. As a result, air or other fluids may flow from a bottom surface of the bottom part through the RFID assembly and out at a top surface of a top part. In an embodiment, the axes along which the holes pass through respective parts may be curvilinear. For example, top hole axis may spiral through top part. Furthermore, exit locations of the holes may be at other surfaces of the parts, for example, top hole may exit at a side surface of top part.

In an embodiment, RFID assembly 1600 may also include alignment feature 1602 and post 1603. Thus, RFID assembly may insert into a corresponding recess 1605 of golf club grip 1604 with alignment feature 1602 engaging recess 1606 and post 1603 engaging channel 1608. Accordingly, fluid may be forced out of shaft 1609 through an end cap hole 1607 and into a jagged and/or curvilinear tag hole 1601 to exit to the surrounding environment.

Positioning the RFID tag in the butt-end of the golf club grip can have several benefits. First, since golf club shafts are typically made of either metal or graphite, any RFID tag attached directly to a metal golf club shaft (i.e. parallel with the shaft) must be raised off the surface of the golf club shaft in order to be read by a RFID reader. For example, it is common for RFID tags to come in thin, "sticker" form (e.g. a wet RFID inlay). If such a wet RFID inlay was attached directly to a graphite golf club shaft, the tag would have normal read characteristics (i.e. the tag could be read by a RFID reader from a distance). Normal RFID read distances can depend on several factors such as frequency, antenna size, transmit power, etc., which will not be discussed in detail herein. However, if the same wet RFID inlay from the example above was attached directly to a metal golf club shaft, the tag may not have normal read characteristics due to the interference between the RFID tag antenna and the metal shaft material. In order to attach RFID tags directly to metal golf club shafts (e.g. parallel with the shaft) a "spacer" may be positioned between the metal shaft and the RFID tag. One advantage of an embodiment described herein (i.e. positioning the RFID tag above the golf club shaft material in the end cap area of the grip, such that the RFID tag is perpendicular to the golf club shaft) is that there is a natural gap or "spacer" in this configuration and RFID tags can be configured in the same manner for both metal and graphite golf club shafts.

Another advantage of an embodiment, (i.e. positioning the RFID tag above the golf club shaft material in the end cap area of the grip, such that the RFID tag is perpendicular to the golf club shaft) is that there is only one butt-end of the golf club grip. This makes it easy for users to locate the RFID tag on the golf club, for purposes of reading from or writing to the RFID tag with a RFID reader.

It is possible to locate the RFID tag in other areas on the golf club. For example, additional embodiments, as shown in FIGS. 17A, 17B, 17C and 18, position the RFID tag within the grip area of the golf club, parallel to the shaft of the golf club. Such configurations can be accomplished by using mold inserts with attached RFID tags during the grip manufacturing process, or by attaching the RFID tags in between layers of the grip material (for layered grip construction configurations only). These non-perpendicular-to-shaft grip-embedded configurations can have advantages over attaching RFID tags directly to the golf club shaft, including that the aesthetics of the golf club are not compromised. Grip-embedded configurations can be invisible to the user therefore having no impact on golf club aesthetics. In contrast, if the RFID tag is attached directly to the shaft—particularly with metal shaft configurations where the RFID tag requires a spacer to lift the tag off the surface of the shaft, the RFID tag may be visible and the aesthetics of the club can be compromised. In addition, the grip-embedded configurations can be more permanent and less prone to being removed by a user. Also, the grip-embedded configurations may not impact the performance of the golf club. In contract, a RFID tag raised up off of the surface of a metal golf club shaft (using, for example, a foam "spacer" material between shaft and tag) can have an impact to the air resistance of the golf club when the club is in use.

FIGS. 17A-17C show an example of a RFID tag that has been molded into the grip of the golf club. The golf club 1700 includes a grip 1701 and a shaft 1702. In one embodiment, at the time the grip 1701 is molded, a RFID tag 1704 with substrate 1703 can be positioned in the mold of the grip before the grip is molded. As discussed previously herein, the RFID is raised off the surface of the shaft 1702 with a substrate material 1703, providing separation between the RFID tag 1704 and shaft 1702 to eliminate potential interference between the RFID tag 1704 and a metal shaft 1702. The substrate material 1703 can be ceramic, plastic, or other non-metal material.

FIG. 18 shows a RFID tag embedded in a grip. The grip 1800 is made by wrapping material around a base layer of the grip, versus molding the grip as one piece. These multi-layered grips are popular and can include a base layer of material, a layer of foam or other material and a layer of leather, synthetic leather or other outer material. It should be understood there are multiple construction types, numbers of layers, and different materials used to form a layered golf club grip. The grip 1800 is attached to a golf club shaft 1801. A base layer of material 1802 surrounds the shaft 1801. A layer of material 1803, which can be a foam material, may be attached to the base layer by wrapping the foam layer 1803 around the base layer 1802, in a fashion indicated by the diagonal lines. In one embodiment, a RFID tag 1804, can be included between layers of material to embed the RFID tag in the grip. In this example a RFID tag may be included between a layer 1803 and an outer layer 1805 but the RFID tag 1804 could be located in between different layers of material.

What is claimed is:

1. A radio frequency identification assembly adapted to be coupled to a golf club grip, the radio frequency identification assembly comprising:
    a radio frequency identification (RFID) tag having a substrate and a tag hole through the substrate;
    a top part having a top hole through the top part; and
    a bottom part having a bottom hole through the bottom part, wherein the RFID tag is positioned between the top part and the bottom part such that the top hole, the bottom hole, and the tag hole are in fluid communication.

2. The RFID assembly of claim 1, wherein the top part is coupled with the bottom part at one or more location lateral to the RFID tag.

3. The RFID assembly of claim 2, further comprising a post extending from the bottom part.

4. The RFID assembly of claim 3, wherein the post includes a post hole through the post, and wherein the post hole and the bottom hole are in fluid communication.

5. The RFID assembly of claim 4, wherein the post includes one or more transverse slot through the post from an outer wall of the post to the post hole.

6. The RFID assembly of claim 3, wherein the post is transversely offset from the bottom hole.

7. The RFID assembly of claim 3, further comprising a nub extending from the post, the nub configured to pass through a hole in a golf club grip and to retain the RFID assembly within the golf club grip.

8. The RFID assembly of claim 7, wherein the nub includes a finger configured to flex transversely inward to pass through the hole in the golf club grip and to flex transversely outward to resist withdrawal from the golf club grip.

9. The RFID assembly of claim 8, further comprising an alignment feature extending from the bottom part, wherein the alignment feature is transversely offset from the bottom hole.

10. A golf club grip, comprising:
    a radio frequency identification (RFID) tag having a substrate and a tag hole through the substrate; and
    a grip having an end cap and a cap hole through the end cap, wherein the RFID tag is coupled with the grip such that the cap hole and the tag hole are in fluid communication.

11. The golf club grip of claim 10, wherein the RFID tag is embedded within the end cap.

12. The golf club grip of claim 10, further comprising:
    a top part having a top hole through the top part; and
    a bottom part having a bottom hole through the bottom part, wherein the RFID tag is positioned between the top part and the bottom part such that the top hole, the bottom hole, and the tag hole are in fluid communication.

13. The gold club grip of claim 12, wherein the top part is coupled with the bottom part at one or more location lateral to the RFID tag.

14. The golf club grip of claim 13, wherein the grip includes a recess in the end cap, wherein the recess is configured to receive the RFID tag with an upper surface of the top part substantially coplanar with an outer surface of the end cap.

15. The golf club grip of claim 13, further comprising an adhesive layer between the RFID tag and the end cap.

16. The golf club grip of claim 13, further comprising a post extending from the bottom part and transversely offset from the bottom hole, wherein the grip includes a channel transversely offset from the grip hole, and wherein the post is configured to engage the channel.

17. A method, comprising:
    positioning a radio frequency identification (RFID) tag relative to a grip such that a tag hole passing through a substrate of the RFID tag is axially aligned with a cap hole passing through an end cap of the grip; and
    coupling the RFID tag with the grip such that the tag hole and the grip hole are placed in fluid communication.

18. The method of claim 17, wherein positioning the RFID tag includes:
    inserting the RFID tag into a grip mold; and
    molding the grip around the RFID tag within the grip mold.

19. The method of claim 17, further comprising:
    positioning the RFID tag between a top part and a bottom part, wherein the top part includes a top hole through the top part and the bottom part includes a bottom hole through the bottom part, and wherein the top hole and the bottom hole are placed in fluid communication; and
    joining the top part with the bottom part such that the RFID tag is retained within a RFID assembly.

20. The method of claim 19, further comprising:
    inserting the RFID assembly into a recess formed in the end cap.

21. The method of claim 19, further comprising:
    molding the grip around a mold insert, wherein the mold insert includes an insert hole through the mold insert, wherein the insert hole and the cap hole are placed in fluid communication, and wherein the mold insert includes a channel transversely offset from the insert hole; and
    inserting a post of the RFID assembly into the channel, wherein the post extends from the bottom part and is transversely offset from the bottom hole.

22. The method of claim 21, further comprising aligning the bottom hole with the insert hole such that the tag hole and the cap hole are placed in fluid communication.

* * * * *